Nov. 23, 1965     R. A. LANGEVIN     3,219,850

ELECTROMECHANICAL TRANSDUCERS

Filed Sept. 16, 1957     2 Sheets-Sheet 1

INVENTOR
ROBERT A. LANGEVIN
BY
ATTORNEY

Nov. 23, 1965  R. A. LANGEVIN  3,219,850
ELECTROMECHANICAL TRANSDUCERS
Filed Sept. 16, 1957  2 Sheets-Sheet 2

INVENTOR
ROBERT A. LANGEVIN
BY Francis N. Marrelle
ATTORNEY

United States Patent Office

3,219,850
Patented Nov. 23, 1965

3,219,850
ELECTROMECHANICAL TRANSDUCERS
Robert A. Langevin, Silver Spring, Md., assignor to Clevite Corporation, Cleveland, Ohio, a corporation of Ohio
Filed Sept. 16, 1957, Ser. No. 684,096
9 Claims. (Cl. 310—8.6)

This invention relates to electromechanical transducers and, more particularly, to laminar composite piezoelectric transducers (known in the art as and sold under the trademark "Bimorphs") which, when mechanically distorted will generate electrical energy or, when electrical energy is applied, will distort mechanically. The invention also relates to transducer devices, i.e., devices embodying transducers as an essential element.

A "Bimorph" is a sandwich type transducer element consisting of two superimposed plates of electromechanically responsive material, for example, Rochelle salt. It is well understood in the art that Bimorph elements can be fabricated to operate in either a flexural or a torsional mode depending on the characteristic action of its component plates, as will be hereinafter more fully described. Bimorph transducers have found may practical applications in microphones, phonograph pickups, record cutters, etc.

It would be very desirable to produce a single electromechanical transducer element which is operative as both a bender (flexural) and a twister (torsional) device. The present invention provides such a device.

A transducer element operative as a bender and a twister would find many practical applications. These applications fall into two categories. One includes devices wherein one mode of operation would be utilized as a generator to convert from mechanical to electrical energy and the other mode utilized as a motor to achieve the converse energy transformation. An example of such a device is a rate-of-turn indicator which forms one embodiment of the present invention hereinafter described.

The other category includes devices where both modes are employed, either simultaneously or selectively, as generators or motors. An example of such devices, constituting another embodiment of the present invention, hereinafter described, is a phonograph pickup or record cutter. In this application, the device may be used as a universal pickup or cutter for playing back or recording either "hill-and-dale" or lateral track record disks. Of equal or greater importance, the device may be employed with both modes concurrently operative so as to record or play back, simultaneously, stereophonically related lateral and hill-and-dale tracks to achieve a binaural effect.

Electromechanical transducers according to the present invention comprise a pair of plates of electromechanically active material coupled in a congruent superposition, one plate being responsive in a face shear mode and the other in an axial extensional mode.

It is a fundamental, general object of the invention to provide novel electromechanical transducer elements capable of operation in two distinct modes.

Another object is the provision of compact, simplified phonograph record cutters and pickups which can record, or transcribe, both lateral and hill-and-dale record tracks, simultaneously or alternatively.

A further object of the invention is the provision of improved and practical binaural phonograph record cutters and pickups employing a single transducer element and stylus.

A still further object is the provision of simple, compact, rugged, and highly-sensitive "rate-of-turn" indicating devices.

These and further objects of the invention as well as the manner of their accomplishment will become apparent to those conversant with the art from the following description and subjoined claims taken in conjunction with the annexed drawings wherein like reference characters designate like parts throughout the several views and, in which:

Figure 1:
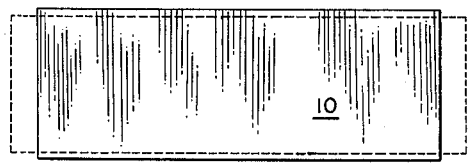
FIGURE 1 is a plan view of a plate of electromechanically active material responsive in an axial extensional mode.

Referring now to the drawings, FIGURE 1 illustrates a rectangular plate 10 of an electromechanically active material such as Rochelle salt, ammonium dihydrogen phosphate (ADP) or the like. Plate 10 is responsive in an axial extensional mode, i.e., when a potential gradient of a given polarity is applied between the major surfaces of the plate, its mechanical distortion, shown in broken line, takes the form of an increase in length accompanied by contraction in width. The degree of distortion is greatly exaggerated in the drawings for the sake of clarity and ease of illustration. Upon removal of the potential the plate returns to its original condition. A potential of reversed polarity causes contraction in length accompanied by width expansion. Plates having this piezoelectric action are well known in the art and are commonly referred to as "length expander plates" or simply "length expanders." Examples of length expander plates are the 45° X- and 45° Y-cuts of Rochelle salt and the 45° Z-cuts of ADP, dipotassium tartrate (DKT), potassium dihydrogen phosphate (KDP), lithium sulphate (LH) suitably poled and electroded plates of ferroelectric ceramics such as barium titanate and lead zirconate titanate also respond in an axial extensional mode.

The piezoelectric properties of such ceramics are well known in the art having been described in the literature by several workers in the field, e.g., H. Jaffe, Phys. Rev. (73), 1261; Cherry and Adler, Phys. Rev. (72), 981; etc.

Figure 2:
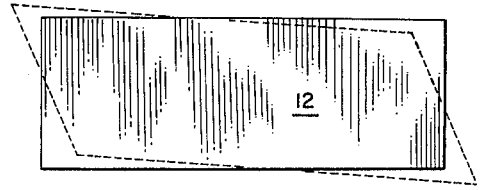
FIGURE 2 is a plan view of a plate of electromechanically active material responsive in a face shear mode.

FIGURE 2 illustrates a rectangular plate 12 of electromechanically active material responsive in the face shear mode and known in the art as a face shear plate. Upon application of a potential gradient between the major surfaces of a shear plate, the plate distorts to the condition shown in broken line, the degree of distortion being greatly exaggerated for ease and clarity of illustration. As in a length expander, the effect of a polarity reversal is a reversal of the direction of distortion. Examples of face shear plates are the 0° X- and 0° Y-cuts of Rochelle salt, the 0° Z-cuts of ADP and KDP, and suitably poled and electroded plates of ferroelectric ceramics such as barium titanate and lead zirconate titanate.

As is well known in the art and described in U.S. Patent No. 2,719,928 to H. G. Baerwald, face shear plates of ferroelectric ceramics are polarized parallel to the major surfaces (i.e., are polarized in the plane of the plate), and have operating electrodes substantially parallel to the direction of polarization. In other words, the axis of the signal field is perpendicular to the axis of polarization and both are in the plane of the plate. A more detailed description of ceramic shear plates and ceramic length expander plates is presented hereinbelow.

Length expander plates such as 10 and face shear plates such as 12 are, in themselves, well known in the art and, therefore, a further discussion of the materials, plate orientation, and/or plate action is unnecessary to a complete understanding of the invention. However, it is pointed out that the invention may be carried out with plates of any type of electromechanically active material having the requisite plate actions.

Heretofore, bender Bimorph elements have been made by superimposing and cementing together a pair of length expander plates oriented and electroded so that an applied potential causes one plate to expand in length and the other to contract. The result is a bending of the unit toward the contracting plate. In like manner twister elements conventionally are made up of a pair of face shear plates as described and claimed in the aforementioned U.S. Patent 2,719,928 to Baerwald.

Figure 3:
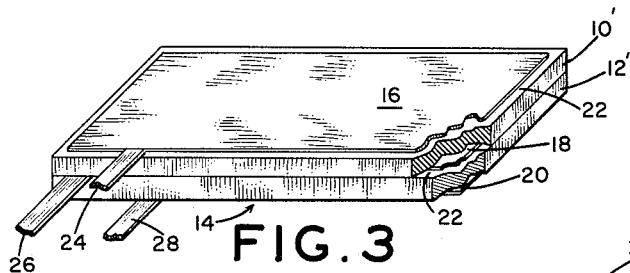
FIGURE 3 is a perspective elevational view of a "Bimorph" transducer element according to the present invention.

A transducer in accordance with the present invention is shown in FIGURE 3 and designated generally by reference character 14. This transducer comprises a pair of plates 10′ and 12′ of electromechanically active material. One plate, 10′ for example, is responsive in an axial extensional mode, i.e., it is a length expander such as illustrated in FIGURE 1. The other plate, 12′, responsive in a face shear mode, is a face shear plate such as illustrated in FIGURE 2.

Plates 10′ and 12′ are mechanically coupled in congruent superposition as shown in FIGURE 3. This may be accomplished in any known and suitable manner such as cementing. Also in any known and suitable manner, an electrode is provided on the exposed major surface of each of plates 10′ and 12′ and another electrode is interposed between the confronting major surfaces of the plates. In FIGURE 3, these electrodes are designated 16, 18 and 20; only electrode 16 appears substantially in its entirety but it will be understood that electrodes 18 and 20 are similar in configuration. Each electrode covers substantially the entire surface with which it is associated but, preferably, a narrow unelectroded margin such as 22 is provided. Suitable leads 24, 26 and 28 are provided for each of the electrodes 16, 18 and 20, respectively.

The operation of the transducer element 14 will now be described with the aid of FIGURES 4 and 5 which schematically depict the element, cantilever mounted, one end being fixed to a rigid support 30. In the interest of simplicity, the laminations, electrodes and leads of the unit 14 have been omitted from FIGURES 4 and 5.

Figure 4:
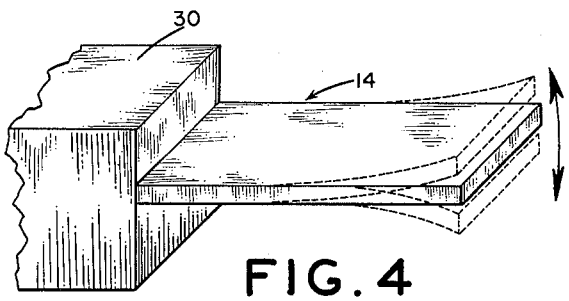
FIGURES 4 and 5 are schematic views, in perspective, showing the flexural and torsional response, respectively, of cantilever-mounted transducer elements according to the present invention.

If the transducer unit 14 is flexed about a transverse axis indicated by the dotted line positions and double-ended arrow in FIGURE 4, then its component plates 10′ and 12′ (FIGURE 3) will be stretched and compressed in a manner exactly analogous to the plates of a conventional bender Bimorph and a voltage proportional to the bending moment appears across terminals 24 and 26 associated with length expander plate 10′ (FIGURE 3). Under these conditions no substantial output appears between terminals 26 and 28, associated with face shear plate 12′ because neither flexural nor longitudinal stressing of such a plate gives a resultant output.

Figure 5:
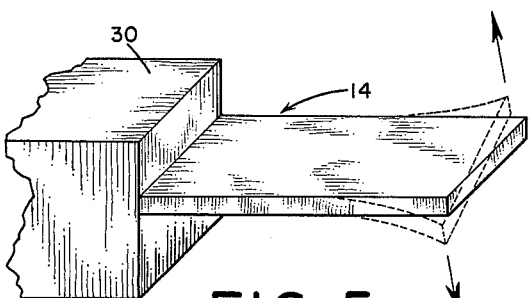

In a similar fashion, if the unit 14 is twisted about its longitudinal axis as indicated by the arrows and dotted line position in FIGURE 5, plate 12′ will undergo a face shear deformation resulting in an output appearing between leads 26, 28 (FIGURE 3) while plate 10′ gives no substantial output under these conditions.

From the foregoing description it will be seen that transducer 14 has independent sensitivity to flexural and torsional displacement. It will be appreciated that the transducer action is reversible, i.e., an electrical signal applied to leads 24, 26 causes bending of the unit and a signal applied between leads 26, 28 causes twisting, as indicated in FIGURES 4 and 5, respectively. While the bending and twisting actions have been described individually for the sake of simplicity, both actions can be operative simultaneously. Thus if a signal is applied between leads 24 and 26 and another between 26 and 28, the mechanical deformation of the unit 14 is the resultant of the bending and twisting motions. The same is true of the transduction from mechanical to electrical energy, i.e., a bending force and a torque may be simultaneously applied to the unit whereupon an electrical signal proportional to the flexure appears between leads 24, 26 and an electrical signal proportional to the torque will appear between leads 26, 28. This arrangement is employed in binaural phonograph record cutters and pickups according to the present invention as hereinafter described.

Still another application of the transducer element 14 involves applying an electrical signal to one pair of leads, for example 24, 26 and then applying a mechanical force stressing the unit so that an electrical signal appears between the other pair of leads, viz., 26, 28. This type of operation is employed in rate-of-turn indicators according to the present invention wherein the mechanical force is due to and proportional to the rate of change in direction.

As previously mentioned transducer elements according to the present invention can be fabricated of polarizable ferroelectric ceramic materials. The attainment of face shear and length expander response in ceramic plates depends on the directional relation between polarization and the signal field. While these relations are, in themselves, well known in the art, as shown by the aforementioned references to the Physical Review, they will be explained nevertheless in conjunction with FGURES 6 and 7 illustrating transducer elements comprising ceramic plates.

Figure 6:
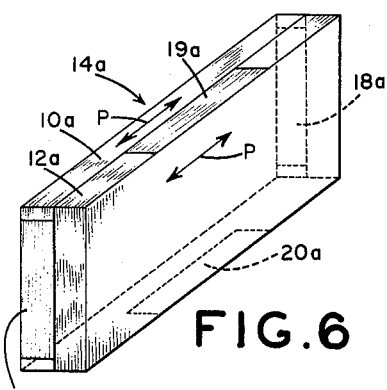
FIGURES 6 and 7 are schematic views, in perspective, illustrating the application of the invention to ceramic "Bimorph" transducer elements.
Figure 7:
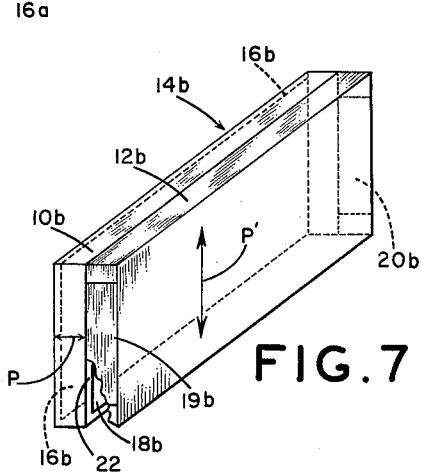

In FIGURES 6 and 7, the respective transducer elements 14a and 14b each consists of a ceramic length expander plate and a ceramic face shear plate superimposed and bonded together as already explained in conjunction with FIGURE 3.

Where the transducer plates are slices cut from a single crystal, the mode of response to a signal field in a given direction is governed by the orientation of the plate with respect to the crystallographic axes of the crystal. In the case of ceramic plates, however, the governing factor is the direction of the signal field relative to the axis of polarization. If the signal field and axis of polarization are parallel, the plate operates in an expansional mode. When the signal field is perpendicular to the axis of polarization, the plate responds in a shear mode.

Referring to FIGURE 6, in transducer element 14a the length expander plate is designated 10a and the shear plate 12a. Both plates are polarized in the direction of doubleheaded arrows P. Signal electrodes 16a and 18a are provided on those opposed edges of length expander plate 10a which are perpendicular to the direction of polarization so that the axis of the signal field is parallel to the direction of polarization. The signal electrodes 19a and 20a of shear plate 12a are applied on opposed edges parallel to the direction of polarization so that the axis of the signal field is perpendicular to the direction of polarization. It will be apparent to those skilled in the art that the areas of the electrodes and the distance between the electrodes of each pair affect the electrical capacity (and, therefore, the impedance) of each plate and that these parameters may be varied to control and, if desired, obtain equal values of impedance for each plate.

Another manner of poling and electroding ceramic plates to obtain respective face shear and length expander response is demonstrated in element 14b, FIGURE 7. In this element, the length expander plate is designated 10b and the face shear plate 12b.

Length expander plate 10b is polarized in the thickness direction as indicated by double-headed arrow P and has signal electrodes 16b and 18b on its major surfaces. Thus the signal field is parallel to the axis of polarization and the plate operates in the longitudinal mode.

Plate 12b is polarized in the direction indicated by double-headed arrow P', i.e., in the plane of the plate, parallel to one pair of its edges, and perpendicular to the other pair. Opposed signal electrodes 19b and 20b are applied to the edges of plate 12b parallel to the direction of poling so that the signal field is perpendicular to the axis of polarization, producing a face shear response. An unelectroded peripheral margin 22 on the inner major surface of plate 10b serves to insulate electrode 18b from electrodes 19b, 20b.

In this particular embodiment, there would be a large difference in impedance across the respective electrode pairs due to the disparity in areas and spacing. If substantially equal impedances are desired as, for example, where the element is used in a stereophonic recording or reproducing system, it would be necessary to adjust the areas and dimensions of the plates to obtain a balance of the impedances of the respective channels.

In elements such as 14a and 14b, there are no common electrodes, the respective pairs of electrodes on the plates each accommodating one channel.

For additional information as to the attainment of face shear response in ceramic plates and the use of face shear ceramic plates in transducers reference may be had to the aforementioned U.S. Patent 2,719,928 to Baerwald. A convenient method of polarizing plates 10a, 12a and 12b is described and claimed in U.S. Patent 2,646,610 to A. L. W. Williams.

Figure 8:
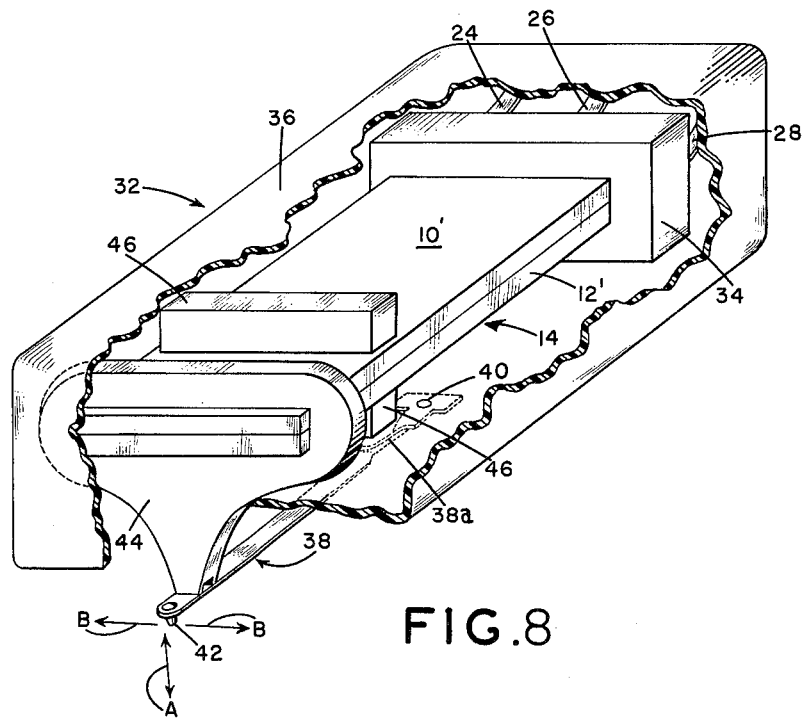
FIGURE 8 is a schematic view, in perspective, of a phonographic pickup or record cutter embodying the present invention.

An exemplary embodiment of a phonograph pickup according to the present invention is illustrated in FIGURE 8 and designated generally by reference character 32. Phonograph pickup 32 comprises a bender-twister Bimorph element 14, already described, having one end suitably clamped in a compliant mounting member 34 of rubber or similar material. Mounting member 34 is secured within one end of a housing or case 36 which may be of generally conventional design. A conventional cantilever-mounted stylus 38 has one end fixed, as by a screw fastener 40, to the underside of housing 36 or other relatively rigid structure of the cartridge. The other end of stylus 38 carries a suitable, conventional stylus point 42 which engages (or "tracks") in the record grooves. Intermediate its ends, stylus 38 has a section 38a which is twisted 90° relative to the remainder in order to provide both vertical and horizontal compliance. Adjacent stylus point 42 the free end of stylus 38 is mechanically coupled, as by a yoke 44, to the free end of Bimorph element 14. In the illustrated embodiment, yoke 44 is in the general form of an inverted isoceles triangle having its apex portion fixedly secured to stylus 38 and its base portion clamping element 14. Yoke 44 is constructed and arranged (1) to transmit to element 14 substantially rectilinear reciprocatory motion (indicated by double-headed arrow A) of stylus point 42 so as to cause flexing of the element about a transverse axis, and (2) to transmit to element 14 torsional oscillatory motion about its longitudinal center line resulting from lateral movement (indicated by double-headed arrow B) of stylus point 42. Damping pads 46 are provided in the customary manner to control the amplitude of movement of element 14 to suppress resonances in the system. These pads preferably are highly compliant blocks disposed between element 14 and the top and bottom surfaces of housing 36.

Leads 24, 26, and 28, corresponding to those shown in and already described in conjunction with FIGURE 3, extend through housing 36 for connection to suitable audio amplification system. For a stereophonic or binaural system, two separate amplifier and speaker systems (not shown) would be employed, and the output between lead 24 and common lead 26 would be fed to one system and the output between the common lead and lead 28 would be fed to the other.

In a monaural system the output from one pair of leads only would be used and fed to the single reproducing system. A suitable switching arrangement, not shown, can be provided to select one pair of leads or the other, thus enabling the pickup to be used for playing either lateral or hill-and-dale recordings. Furthermore, the pickup can play individually, either the lateral or the hill-and-dale track of a binaural disk recording so that a monaural system can be used to play binaural recordings and, at some future time, can be converted easily to a binaural system by the addition of a second amplifier and speaker. This enables a binaural record enthusiast to acquire binaural recordings and play one track until it is feasible to add the additional equipment for a binaural system.

It will be appreciated that, while a phonograph pickup has been described and is illustrated in FIGURE 8, the principles of the present invention are equally applicable, in all respects, to a record cutting head. The structural changes necessary to adapt the FIGURE 8 structure, for example, to the installation and use of a cutting stylus are not germane to the present invention.

The operation of element 14 and of the phonograph pickup, as regards its general application to both monaural and binaural systems, is believed to be evident from the foregoing description. The specific function of the pickup is as follows: In response to the hill-and-dale (or vertical) track of the record, stylus point 42 reciprocates in an approximately vertical linear path, denoted by double-headed arrow A, as permitted by the compliance of the stylus in a vertical plane. This vertical reciprocation of the stylus point is transmitted by yoke 44 to and causes corresponding flexural vibration of element 14 resulting in an output from length expander plate 10' which appears between leads 24 and 26. In response to the lateral (or horizontal) track of the record, stylus point 42 oscillates in a generally horizontal plane as permitted the horizontal compliance of the stylus. This causes yoke 44 to oscillate about the longitudinal center line of element 14 and transmit a torque to and cause corresponding twisting vibrations of the element. The twisting vibrations are reflected by an output from face shear plate 12' which appears between leads 26 and 28.

Figure 9:
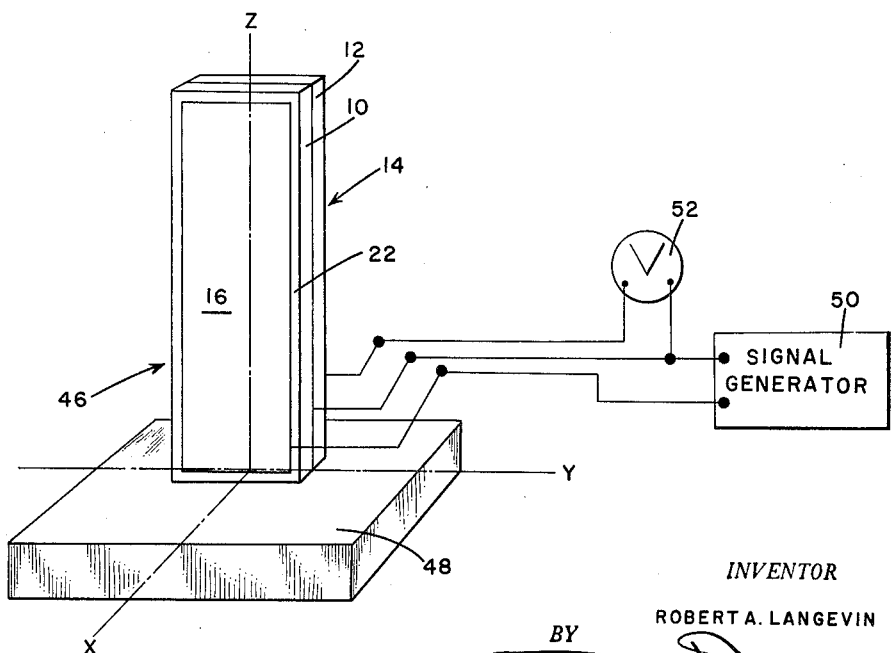
FIGURE 9 is a schematic view, in perspective, of a rate-of-turn indicating device embodying the present invention.

Referring now to FIGURE 9, there is illustrated a rate-of-turn indicator 46, according to the present invention. It comprises a bender-twister "Bimorph" element 14 which may be in all respects identical to that already described except that, for use in the rate-of-turn device, the element preferably would be larger. Element 14 is mounted perpendicular to the plane in which the rotation to be detected occurs. In the illustrated embodiment, Bimorph 14 is shown in a vertical position, with its lower end imbedded in, cemented on or otherwise secured to a base plate 48. Mutually perpendicular coordinate axes X, Y, and Z are shown in the drawing to facilitate directional designations.

As schematically indicated in FIGURE 9, leads 24 and 26 of the length expander plate are connected to a signal generator 50 which represents any suitable source of an alternating potential. Leads 26 and 28 of the face shear plate are connected to a sensitive voltage measuring device, represented by voltmeter 52.

In operation the signal generator supplies a signal of substantially constant frequency and amplitude to element 14 which responds with flexural vibrations in the XZ plane. This is the static or zero turn condition. The meter may be read or zeroed in the event that there is any spurious reading due to cross coupling between the bending and twisting modes of element 14.

The inertia of the vibrating element resists a change of angular position of the unit. Therefore, if base member 48 (or the structure on which it is mounted) is rotated about the Z-axis, while the free end of the element 14 tends to remain stationary due to its motional inertia, the net result is a twisting of the element which thus generates an output appearing between leads 26 and 28. The amount of twisting and, therefore, the resultant output measured by meter 52 is proportional to the rate-of-turn. This will be recognized by persons familiar with the art and can be demonstrated mathematically and experimentally.

The foregoing explanation is an over-simplification in that the twisting resulting from turning the element about the Z-axis while it is vibrating in the flexural mode in the XZ plane, causes an oscillating or "A.-C." twisting such as would result from applying a sinusoidal input to the electrodes of the face shear plate.

In either case, the sensitivity of the device, i.e., the amount of output for a given rate-of-turn is proportional to the moment of inertia of the vibrating element which, in turn depends on the effective mass of the element 14, the frequency at which it is driven, and the amplitude of its vibrations. If the element is driven at its resonant frequency, its amplitude will be maximum for a given input intensity but resonant frequency depends on the effective mass and compliance of the element; therefore, a compromise in the design and operating characteristics is necessary.

While there have been described what at present are considered to be preferred embodiments of the invention, it will be obvious to those skilled in the art that various changes and modifications can be made therein without departing from the invention, and it is aimed, therefore, in the appended claims to cover all such changes and modifications as fall within the true spirit and scope of the invention.

This application is continued-in-part in a copending application of Carmen P. Germano, Serial No. 783,483 filed December 19, 1958.

I claim:

1. An electromechanical transducer comprising: a plate of electromechanically active material responsive in the face shear mode and a plate of electromechanically active material responsive in an extensional mode, said plates being superposed and mechanically coupled with a respective major surface of each in confronting relation.

2. An electromechanical transducer comprising: a plate of electromechanically active material responsive in the face shear mode and a plate of electromechanically active material responsive in an extensional mode, said plates being superposed and mechanically coupled with a respective major surface of each in confronting relation; and operative electrode means forming opposed electrode pairs on each of said plates.

3. An electromechanical transducer comprising: a plate of electromechanically active material having a face shear mode response associated with electric potential differences between its major surfaces; a plate of electromechanically active material having an extensional mode response associated with electric potential differences between its major surfaces, said plates being superposed and mechanically coupled with a respective major surface of each in confronting relation; and electrode means associated with the major surfaces of said plates.

4. An electromechanical transducer according to claim 3 wherein said electrode means include an electrode interposed between said plates and an electrode on the exposed major surface of each of said plates.

5. An electromechanical transducer comprising: a pair of plates of electromechanically active material mechanically coupled in congruent parallel superposition, said plates being oriented and electroded so that one is responsive in a face shear mode and the other in an axial extensional mode.

6. An electromechanical transducer comprising: a plate of electromechanically active material having a face shear mode response associated with electric potential differences between its major surfaces and a plate of electromechanically active material having an extensional mode response associated with electric potential differences between its major surfaces, said plates being superposed and mechanically coupled with a respective major surface of each in confronting relation; electrode means associated with said plates including a common electrode interposed between said plates and an electrode on the major surface of each of said plates; and means for making individual electrical connections to each of said electrodes.

7. An electromechanical transducer comprising: a pair of plates of polarizable ferroelectric ceramic material mechanically coupled in congruent superposition, one of said plates being poled and electroded for operation in the face shear mode and the other for operation in an axial extensional mode.

8. An electromechanical transducer according to claim 7 wherein said one plate is polarized parallel to its major surfaces and is electroded on opposed edges parallel to the direction of polarization and said other plate is polarized in its thickness direction and is electroded on its major surfaces.

9. An electromechanical transducer according to claim 7 wherein both of said plates are polarized in the same direction and parallel to their respective major surfaces, said one plate being electroded on opposed edges substantially parallel to said direction of polarization and said other plate being electroded on opposed edges perpendicular to said direction of polarization.

References Cited by the Examiner
UNITED STATES PATENTS
2,444,590   7/1948   Bokeny _____ 310—8.6

ORIS L. RADER, *Primary Examiner.*

GEORGE N. WESTBY, SIMON YAFFEE, *Examiners.*